United States Patent [19]

Nohira et al.

[11] 4,282,845
[45] Aug. 11, 1981

[54] INTERNAL COMBUSTION ENGINE WITH EXHAUST GAS ACCUMULATION CHAMBER

[75] Inventors: Hidetaka Nohira, Mishima; Sumio Ito, Susono; Hisashi Oki, Numazu, all of Japan

[73] Assignee: Toyota Jidosha Kogyo Kabushiki Kaisha, Toyota, Japan

[21] Appl. No.: 22,490

[22] Filed: Mar. 21, 1979

[51] Int. Cl.³ .............................................. F02M 25/06
[52] U.S. Cl. .................................... 123/568; 123/433
[58] Field of Search ............... 123/119 A, 75 R, 75 B, 123/32 ST, 568, 308, 429, 430, 433

[56] References Cited

U.S. PATENT DOCUMENTS

| | | | |
|---|---|---|---|
| 1,648,929 | 11/1927 | Zaikowsky | 123/75 R X |
| 2,678,640 | 5/1954 | Scirocco | 123/433 |
| 3,092,089 | 6/1963 | Dolza | 123/433 X |
| 3,363,611 | 1/1968 | Seggern et al. | 123/433 X |
| 3,799,130 | 3/1974 | Dahlstrom | 123/568 |
| 3,875,914 | 4/1975 | Villella | 123/119 A |
| 3,905,344 | 9/1975 | Villella | 123/119 A X |
| 3,918,420 | 11/1975 | Villella | 123/119 A X |
| 3,982,514 | 9/1976 | Turns et al. | 123/119 A |
| 3,986,351 | 10/1976 | Woods et al. | 123/119 A X |
| 4,033,302 | 7/1977 | Jarnuszkiewicz | 123/568 X |
| 4,060,059 | 11/1977 | Blaser | 123/568 |
| 4,060,061 | 11/1977 | Might | 123/568 X |
| 4,109,625 | 8/1978 | Kawamura et al. | 123/119 A |
| 4,175,522 | 11/1979 | Kawamura et al. | 123/119 A |
| 4,176,632 | 12/1979 | Franke | 123/433 |
| 4,193,382 | 3/1980 | Oshima | 123/32 ST |
| 4,194,472 | 3/1980 | Amano et al. | 123/119 A |

FOREIGN PATENT DOCUMENTS 51-33205  3/1976  Japan .

*Primary Examiner*—Stuart S. Levy
*Attorney, Agent, or Firm*—Kenyon & Kenyon

[57] ABSTRACT

An internal combustion engine with an exhaust gas accumulation chamber, a valve for controlling the flow of the exhaust gas into and from the exhaust gas accumulation chamber and a communicating passage for communicating the cylinder bore of the combustion chamber with the exhaust gas accumulation chamber, along which cylinder bore the piston is reciprocated. The valve is open from a first time in the compression stroke to a second time in the succeeding expansion stroke. Due to the combined operation of the valve and the movement of the piston, the exhaust gas is accumulated within the accumulation chamber only near the end of the expansion stroke and is spouted from the accumulation chamber only in the beginning of the compression stroke. The communicating passage is so arranged that the exhaust gas spouted from the accumulation chamber into the combustion chamber generates a swirl motion in the combustible gas mixture.

6 Claims, 12 Drawing Figures

INTERNAL COMBUSTION ENGINE WITH EXHAUST GAS ACCUMULATION CHAMBER

BACKGROUND OF THE INVENTION

This invention relates to an internal combustion engine with a combustion chamber and an exhaust gas accumulation chamber, more particularly to an internal combustion engine wherein a part of a combustible gas mixture after being burned in the combustion chamber is temporally accumulated within the accumulation chamber, and then the accumulated burnt gas is mixed with the next charge of combustible intake gas introduced into the combustion chamber, so that oxides of nitrogen ($NO_x$) in the exhaust gas emitted from the engine can be reduced.

DESCRIPTION OF THE PRIOR ART

It is well known to recirculate exhaust gas into a combustion chamber so that a reduction of $NO_x$ can be achieved. In conventional EGR methods, a part of the exhaust gas in the exhaust system of an engine is recirculated into the intake system of the engine and is mixed with fresh intake gas, and then the gas mixture containing the recirculated exhaust gas therein is introduced into the combustion chamber. With such methods, however, when the exhaust gas is recirculated, the volume of fresh intake gas is correspondingly reduced due to displacement by the recirculated exhaust gas, and as a result of the reduction in the amount of fresh intake gas, the output of the engine is decreased.

To overcome the above drawback, a method has been proposed wherein an internal combustion engine is utilized which comprises a cylinder closed by a cylinder head with an intake valve and an exhaust valve to form a combustion chamber in combination with a top of a piston reciprocably mounted in the cylinder, an exhaust gas accumulation chamber communicated with the combustion chamber at a surface thereof where the piston does not reciprocate, and a third valve disposed at the entrance of the exhaust gas accumulation chamber. The third valve is so operated that it opens and closes the entrance of the accumulation chamber. More specifically, the third valve is open from the last part of the expansion stroke to just before the completion of the expansion stroke, so that a part of the exhaust gas is accumulated within the accumulation chamber, and then the third valve is closed. The third valve is re-opened at the beginning of the next compression stroke, so that the exhaust gas accumulated within the accumulation chamber is reintroduced into the combustion chamber, after which the third valve is again closed. According to this method, the drawback discussed above can be overcome. In this method, however, it is necessary to open and close the third valve twice per one cycle of the engine, each time during only a short crank angle. As a result, the shape of the cam which operates the third valve is complicated and difficult to manufacture; further, abrasion of the third valve and the cam occurs. Accordingly, this method is applicable only to a low speed internal combustion engine and is not practical for a high speed internal combustion engine, such as an automobile engine. In addition, since in this method the third valve is operated at the beginning of the compression stroke, the turbulences generated by the gas spouted through the third valve diminish by the time of spark plug firing, and an engine in which this method is carried out, and in which the intake valve is opened for a certain period of time after the lower dead center of the crankshaft is reached, cannot achieve as great a reduction of $NO_x$ as the usual exhaust gas recirculation does. Furthermore, in a case where the operations of the intake valve, the exhaust valve and the third valve are not appropriately timed, the output of the engine may be decreased.

Another method is also known, for example from U.S. Pat. No. 1,648,929, again wherein an exhaust gas accumulation chamber communicates with a wall of the combustion chamber along which the piston is not reciprocated, and a third valve is disposed at the entrance of the accumulation chamber for controlling the flow into and from the accumulation chamber. In this method the third valve opens at the last part of the compression stroke instead of at the beginning, so that the burnt gas accumulated within the exhaust gas accumulation chamber during the previous cycle is introduced into the combustion chamber, and as a result, exhaust gas recirculation is carried out. The third valve is maintained open for a certain period of time after the upper dead center of the crankshaft until the pressure of the subsequently ignited and burned compressed gas has reached a maximum value, so that part of this amount of burnt gas is introduced into the exhaust gas accumulation chamber. Then the third valve is closed, so that the burnt gas is temporally accumulated for the next cycle. According to this method the drawbacks of decreasing the amount of the new intake gas and of frequent operation of the third valve can be overcome. In this method, however, since the combustion chamber continues to be communicated with the exhaust gas accumulation chamber when the burnt gas pressure is at a maximum, the compression ratio of the engine is decreased, and a large thermal loss is caused because energy in the gas which is accumulated in the exhaust gas accumulation chamber cannot be used for driving the engine. Also, the third valve and the accumulation chamber must be constructed of heat resistance materials, since the gas at a high temperature and under high pressure must be accumulated within the exhaust gas accumulation chamber through the third valve. In addition, since only burnt gas should be accumulated within the exhaust gas accumulation chamber, the third valve must be disposed adjacent to a spark plug.

Since the flame speed in a combustible gas mixture which includes a large amount of burnt gas is low, the combustible gas mixture cannot be burnt steadily in combustion chambers having a conventional structure, and the operating stability of the engine is degraded. On the other hand, it is well known that if a swirl motion is generated in a combustible gas mixture including a large amount of burnt gas, so that strong turbulences are generated, the flame speed is increased and the combustible gas mixture burns steadily. As a result, the operating stability of the engine is increased and a reduction of fuel consumption can be achieved.

SUMMARY OF THE INVENTION

An object of the present invention is to provide an internal combustion engine with a third valve for selectively communicating a combustion chamber with an exhaust gas accumulation chamber, which is disposed adjacent to the combustion chamber of the engine, such that burnt gas accumulates in the accumulation chamber during the expansion stroke, preferably at the last part of the expansion stroke, and is spouted into the combustion chamber at the next compression stroke, so that the frequency of operation of the third valve is only once per engine cycle.

Another object of the present invention is to provide an internal combustion engine with an exhaust gas accumulation chamber, the flow of the burnt gas into and from which is controlled by the combined operation of a third valve and the movement of a piston reciprocably disposed within a cylinder and defining the size of the combustion chamber, so that the volume of the intake gas at the time of maximum pressure in the cylinder is equal to that of the combustion chamber at the time, and as a result, there is no reduction of the output of the engine.

A further object of the present invention is to provide an internal combustion engine with an exhaust gas accumulation chamber which is so arranged that when the burnt gas accumulated within the exhaust gas accumulation chamber spouts into the combustion chamber it will generate strong turbulences in the combustible gas mixture within the combustion chamber, so that the combustible gas mixture will burn steadily.

BRIEF DESCRIPTION OF THE DRAWINGS

Some embodiments of the present invention will be explained hereinafter with reference to accompanying drawings, wherein.

DETAILED DESCRIPTION OF THE INVENTION

Figure 1:
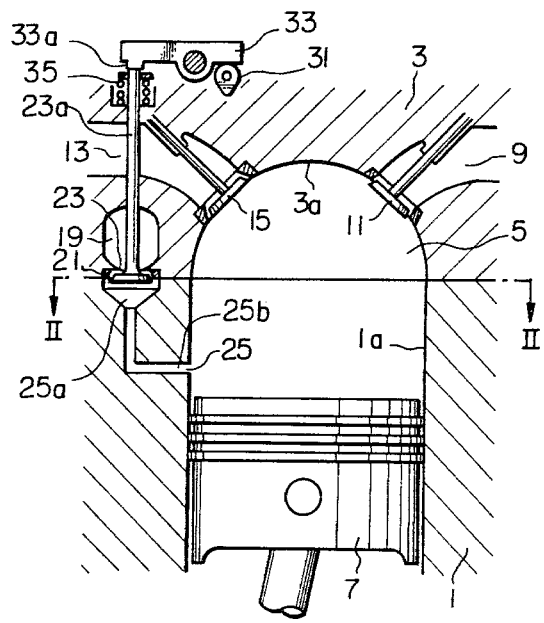
FIG. 1 is a cross sectioned elevational view of a first embodiment according to the present invention.

Referring to FIG. 1, a cylinder block 1 having a circular cylinder bore 1a formed therein is secured to a cylinder head 3 having a recess 3a formed therein, so that a cylinder space is formed by the cylinder bore 1a and the recess 3a. A piston 7 is sealingly and reciprocatingly inserted within the cylinder bore 1a, so that a combustion chamber 5 is formed by the cylinder bore 1a, the recess 3a and the top surface of the piston 7. An intake passage 9, which is communicated with a fuel supply device such as a carburetor (not shown), is communicated with the combustion chamber 5. An intake valve 11, which controls the introduction of the intake gas into the combustion chamber 5, is disposed between the intake passage 9 and the combustion chamber 5 and is operated in synchronism with rotation of the crankshaft by means of a valve mechanism of known type (not shown). Similarly an exhaust passage 13, which communicates with an exhaust pipe (not shown) and with the combustion chamber 5. An exhaust valve 15, which controls the flow of the exhaust gas from the combustion chamber 5 into the exhaust passsage 13, is disposed between the combustion chamber 5 and the exhaust passage 13 and is operated in synchronism with rotation of the crankshaft by means of a valve mechanism of known type (not shown). A spark plug 17 (FIG. 2), which ignites the combustible gas mixture within the combustion chamber 5, is thread secured to the cylinder head 3.

Figure 2:
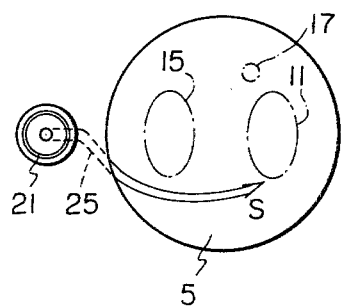
FIG. 2 is a view taken along line II—II in FIG. 1.
Figure 6:
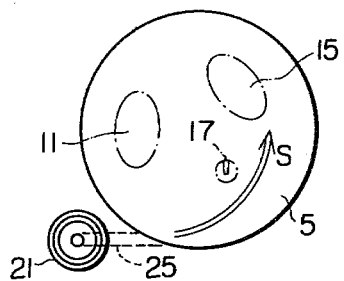
FIG. 6 is a cross sectional plan view which illustrates a second embodiment of the present invention and which is similar to FIG. 2.

A cavity 19 is formed within the cylinder head 3, at a position adjacent to the combustion chamber 5. The cavity 19 is used as an exhaust gas accumulation chamber and is referred to as "exhaust gas accumulation chamber 19" hereinafter. A valve seat 21 is fixed at the entrance of the exhaust gas accumulation chamber 19. A third valve 23, which cooperates with the valve seat 21, is operated by a valve drive mechanism which is similar to a known conventional valve drive mechanism and which comprises a cam 31 rotated in synchronism with the crankshaft, a swingable rocker arm 33, a valve rod 23a connected to the third valve 23 and pressed by a rocker arm pad 33a of the rocker arm 33, and a spring 35 for urging the third valve 23 upwardly in synchronism with rotation of the crankshaft (not shown), in accordance with a valve operating schedule which will be explained later. A communicating passage 25 of a small diameter is formed within the cylinder block 1, so that one end 25a of the communicating passage 25 faces the exhaust gas accumulation chamber 19 and that the other end 25b of the communicating passage 25 is communicated with a surface of the cylinder bore 1a of the combustion chamber 5 where the piston 7 is reciprocated. The other end 25b of the communicating passage 25 opens into the cylindrical cylinder bore 3a of the combustion chamber in an approximately tangential direction as illustrated in FIGS. 2 and 6, so that when the exhaust gas spouts from the exhaust gas accumulation chamber 19, as will be explained later, a swirl motion (arrow S) is generated in the combustion chamber 5 by the spouted exhaust gas. In the embodiment illustrated in FIG. 6, the arrangement of the intake valve 11, the exhaust valve 15 and the spark plug 17 is different from that illustrated in FIG. 2, so that the flow of the swirl motion in FIG. 6 generated by the spounted exhaust gas sweeps the flame adjacent to the spark plug 17 toward the exhaust valve 15. As a result, almost all end gas is blown from the region around the exhaust valve 15, and self-ignition and knocking of the engine can be prevented.

Figure 3A:
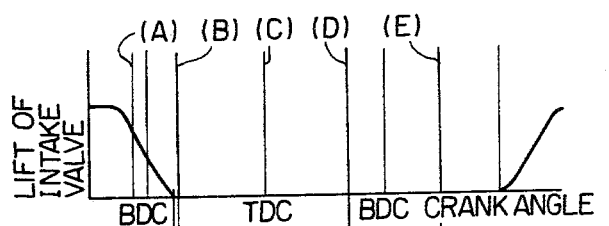
FIGS. 3(a) through 3(c) are diagrams which illustrate the operations of the intake valve, the exhaust valve and the third valve of the first embodiment according to the present invention, respectively.
Figure 3B:
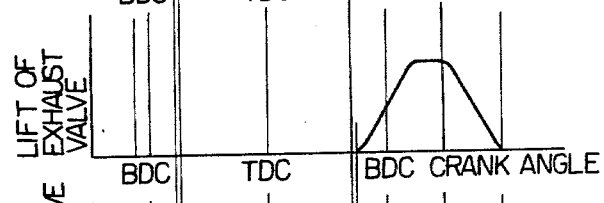
Figure 3C:
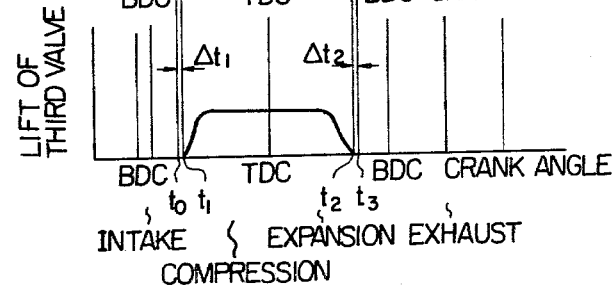

The timing of the operation of the intake valve 11, the exhaust valve 15 and the third valve 23 will now be explained with the reference to FIGS. 3(a) through 3(c). As illustrated in FIG. 3(a), the intake valve 11 (FIG. 1) is open during the intake stroke, so that the intake gas supplied from the carburetor through the intake passage 9 (FIG. 1) is introduced into the combustion chamber 5; then the intake valve 11 closes in the beginning of the compression stroke and remains shut during expansion and the exhaust strokes. The exhaust valve 15 (FIG. 1) is open from the last part of the expansion stroke to the end of the exhaust stroke, so that the exhaust gas in the combustion chamber 5 (FIG. 1) is exhausted into the exhaust passage 13 (see FIG. 3(b)). The third valve 23 is opened at a first time $t_1$, which takes place after small time interval $\Delta t_1$ after the time $t_0$ when the intake valve 11 is closed in the compression stroke, as illustrated in FIG. 3(c), and is closed at second time $t_2$ in the expansion stroke. When a small time interval $\Delta t_2$ has passed from the second time $t_2$, the exhaust valve 15 opens (time $t_3$).

Figure 4:
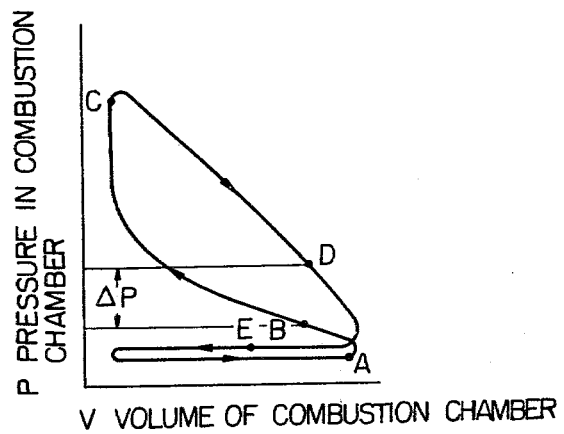
FIG. 4 is an indicator diagram.

The operation of the first embodiment according to the present invention will now be explained with reference to FIG. 4, which illustrates an indicator diagram, and FIGS. 5A through 5E, which illustrate the operation of the first embodiment. It should be pointed out that the symbols A, B, C, D and E in FIG. 4 correspond the conditions of FIGS. 5A, 5B, 5C 5D and 5E, respectively. Similarly, the symbols (A), (B), (C), (D) and (E) in FIG. 3(a) designate the times A through D in FIG. 4, respectively, and correspond to FIGS. 5A through 5E, respectively.

Figure 5A:
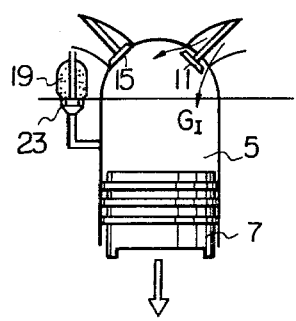
FIGS. 5A through FIG. 5E are diagramatic elevational views which illustrate the operations of the first embodiment of the present invention.
Figure 5B:
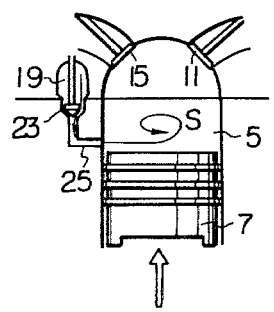
Figure 5C:
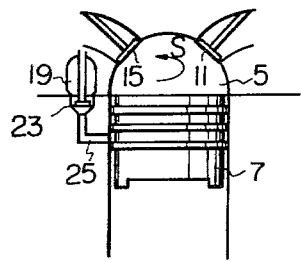
Figure 5D:
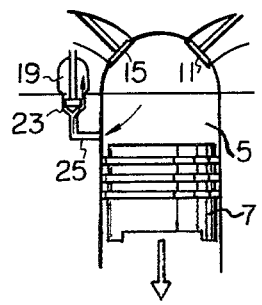
Figure 5E:
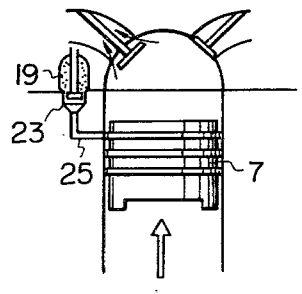

FIG. 5A illustrates the condition at the last part of the intake stroke, at which time the third valve 23 is closed, and the exhaust gas accumulation chamber 19 contains burnt gas under high pressure, which was introduced during the previous cycle as will be explained later with reference to FIGS. 5D and 5E. The exhaust valve 15 is closed, the intake valve 11 is open and the piston 7 is moving downwardly, so that the intake gas (arrow $G_1$) is introduced into the combustion chamber 5 through the intake valve 11.

When the piston 7 begins to move upwardly and the compression stroke is commenced, the intake valve 11 is closed and the exhaust valve 15 is maintained closed, and the intake gas in the combustion chamber 5 is compressed. At the first time $t_1$ (FIG. 3(c)), the third valve 23 opens. As mentioned above, since exhaust gas having a high pressure, which corresponds to that of condition D in FIG. 4, is accumulated within the exhaust gas accumulation chamber 19, the accumulated exhaust gas spouts out at a high speed from the exhaust gas accumulation chamber 19 through the communicating passage 25 into the combustion chamber 5, due to the pressure difference $\Delta P$ between the conditions D and B (FIG. 4). Since the communicating passage 25 opens approximately tangentially into the cylinder bore 3a of the combustion chamber 5, as mentioned above, the spouted burnt gas generates a swirl motion (arrow S) in the combustion chamber 5 (see FIGS. 2 and 6). The introduction of the inert burnt gas into the fresh intake mixture provides an advantage which is similar to that achieved by exhaust gas recirculation. In addition, the swirl motion generated by the spouted burnt gas facilitates mixing of the combustible gas mixture and the generation of the turbulences in the combustible gas mixture. Back flow and leakage of the intake gas mixture can be prevented by closing the intake valve just before the exhaust gas spouts. This part of the cycle is illustrated by FIG. 5B.

As the piston 7 moves upward past the level at which the opening of the communicating passage 25 is closed by the side surface of the piston 7, the spouting of the exhaust gas from the exhaust gas accumulation chamber 19 is stopped. When the piston 7 reaches approximately top dead center, as illustrated in FIG. 5C, the spark plug fires. Thereafter, the piston 7 commences its downward motion, and the expansion stroke is commenced. Since the communicating passage 25 is closed by the piston 7, the combustible gas mixture and the burnt gas remain in the combustion chamber and do not flow into the exhaust gas accumulation chamber 19. Because of the strong turbulences generated in the combustible gas mixture within the combustion chamber by the swirl motion produced by the previously spouted exhaust gas (arrow S), the combustible gas mixture burns steadily, while the reduction of $NO_x$ is achieved due to the introduction of the burnt gas. When the top surface of the downwardly moving piston 7 reaches a position below the opening of the communicating passage 25, as illustrated in FIG. 5D, part of the burnt gas under high pressure in the combustion chamber 5 flows into the exhaust gas accumulation chamber 9 through the communicating passage 25. It should be noted that the location where the communicating passage 25 opens into the cylinder bore 3a must carefully be determined. If the opening of communicating passage 25 is too high, some thermal energy in the combustible gas mixture may not be utilized. Therefore, it is preferable that the communicating passage 25 be so arranged that the top of the piston 7 reaches the opening of the communicating passage 25 just before the exhaust valve is opened.

At the second time $t_2$ (FIG. 3(c)), the third valve 23 is closed, thereby trapping the accumulated burnt gas under high pressure in the exhaust gas accumulation chamber 19. Since the third valve 23 is closed just before the exhaust valve 15 is opened at time $t_3$ as mentioned above, leakage of the burnt gas accumulated within the exhaust gas accumulation chamber 5 through the exhaust valve 15 is prevented.

The exhaust valve 15 remains open, while the third valve 23 remains closed as the piston 7 begins to move upwardly, so that the exhaust gas remaining in the combustion chamber 5 is exhausted, while the part of the burnt gas which will be used in the next cycle is held within the exhaust gas accumulation chamber.

In the present invention, since the burnt gas is accumulated within the exhaust gas accumulation chamber under high pressure in the expansion stroke and is spouted into the combustion chamber in the compression stroke, the amount of intake gas introduced during each intake stroke is not decreased, yet the exhaust gas can be recirculated. As a result, the amount of $NO_x$ emitted in the exhaust gas can be reduced without decreasing the output of the engine. The exhaust gas can also be recirculated according to the present invention while the engine is operating under a full load. In the present invention, since the combined operation of the third valve and the movement of the piston is utilized, the third valve is need be operated only once per one cycle, and as a result, the abrasion of the third valve is minimal. Accordingly, the mechanism according to the present invention is preferable for an engine which operates at high speed. Since the exhaust gas is not accumulated within the exhaust gas accumulation chamber until it has already completed its expansion at the end of the expansion stroke, the loss of thermal energy is very small. In addition, in the present invention, since the exhaust gas spouted into the combustion chamber from the exhaust gas accumulation chamber generates turbulences in the combustible gas mixture, the flame speed of the combustible gas is increased, and as a result, the combustible gas mixture burns steadily and a reduction of fuel consumption can be achieved.

What we claim is:
1. An internal combustion engine which includes:
 a cylinder block which has a cylinder bore formed therein and a piston sealingly inserted in said bore, said piston being connected to a rotatable crankshaft for reciprocation in the cylinder;
 a cylinder head which has a recess formed therein containing an intake valve for controlling the introduction of intake air into the cylinder and an exhaust valve for controlling the discharge of burnt gases from the cylinder and which is secured to said cylinder block so that a combustion chamber is formed by said cylinder bore, said recess and the top of said piston;

an exhaust gas accumulation chamber formed adjacent to said combustion chamber and having an entrance;
a third valve which is disposed at the entrance of said exhaust gas accumulation chamber; and
a communicating passage for communicating said third valve with said combustion chamber, wherein the improvement comprises:
means for opening said third valve once each engine cycle at a first predetermined time in the compression stroke and for shutting said third valve once each cycle at a second predetermined time in the succeeding expansion stroke, in synchronism with rotation of said crankshaft, and wherein
said communicating passage opens into a surface of said cylinder bore, at a level between the top and bottom dead center positions of the top of said piston wherein said piston acts to open and shut the entrance to said accumulation chamber at predetermined times between the opening and shutting of said third valve.

2. An internal combustion engine according to claim 1, wherein the opening of said communicating passage into the surface of the cylinder bore is so arranged that exhaust gas accumulated at high pressure in said exhaust gas accumulation chamber during each expansion stroke will spout into said combustion chamber during the succeeding compression stroke in a direction having a substantial tangential component so as to generate a swirl motion in said combustion chamber.

3. An internal combustion engine according to claim 1 or 2, wherein said second predetermined time occurs in the last part of the expansion stroke.

4. An internal combustion engine according to claim 3, wherein said first predetermined time occurs a small time interval after the time when said intake valve for controlling the introduction of the intake gas shuts.

5. An internal combustion engine according to claim 3, wherein said second predetermined time occurs a small time interval before the time when said exhaust valve for controlling the discharge of the exhaust gas opens.

6. An internal combustion engine according to claim 5, wherein the opening of said communicating passage into the cylinder is located in the lower half of said surface of said cylinder bore between the top and bottom dead center positions of the top of said piston.

* * * * *

UNITED STATES PATENT AND TRADEMARK OFFICE
CERTIFICATE OF CORRECTION

PATENT NO. : 4,282,845
DATED : August 11, 1981
INVENTOR(S) : Hidetaka Nohira, et al It is certified that error appears in the above-identified patent and that said Letters Patent is hereby corrected as shown below:

Column IV, line 39, after "generated by the" correct spelling of "spouted".

Col. IV, line 53, after "shut during" add the word --the--.

Col. IV, line 59, after "takes place" change "after" to --a--.

Col. IV, line 62, after "is closed at" insert --a--.

Col. V, line 4, between "5C 5D" insert a comma (,).

Col. VI, line 39, after "third valve" delete "is"; after "per" delete "one".

Signed and Sealed this

Seventeenth Day of August 1982

[SEAL]

Attest:

Attesting Officer

GERALD J. MOSSINGHOFF

Commissioner of Patents and Trademarks